UNITED STATES PATENT OFFICE.

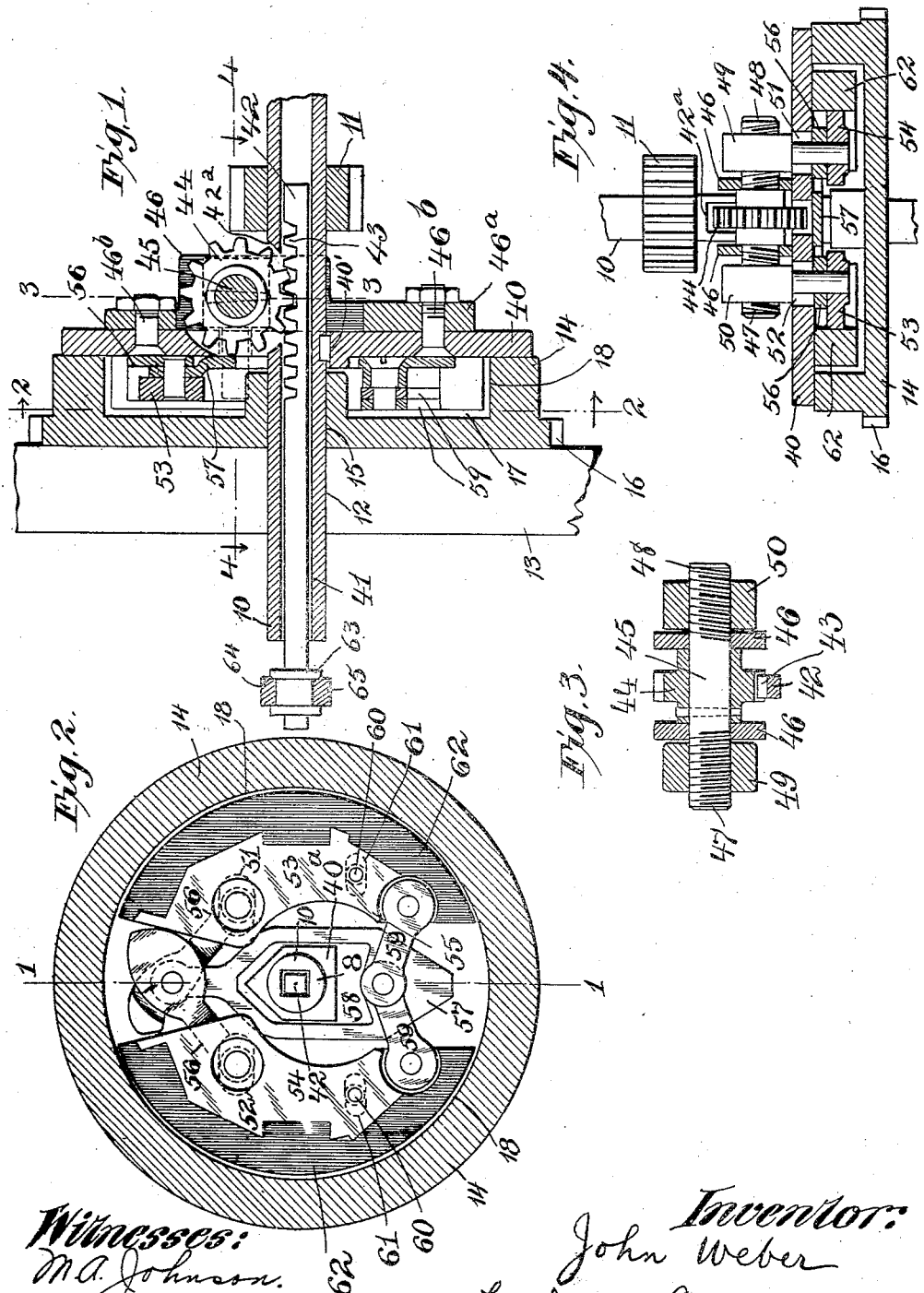

JOHN WEBER, OF NEWARK, NEW JERSEY.

CLUTCH.

1,150,237.  Specification of Letters Patent.  Patented Aug. 17, 1915.

Application filed May 15, 1913. Serial No. 767,833.

*To all whom it may concern:*

Be it known that I, JOHN WEBER, a subject of the Emperor of Austria-Hungary, and a resident of the city of Newark, county of Essex, and State of New Jersey, have invented certain new and useful Improvements in Clutches, of which the following is a specification.

My invention relates to the improvement of clutches, and more especially to the provision of novel means for expanding and contracting the male clutch member.

A clutch embodying my invention may be used in any connection where clutches are useful.

Among the objects of my invention are the provision of a clutch which may be simply constructed, is rugged and not readily gotten out of order, is efficient in clutching action and at the same time is readily put into inoperative relation, and in which the parts thereof, when a pair of clutch members is used, are maintained in substantial parallelism by a system of linkage connections as the male member of the clutch is expanded or contracted.

With the foregoing and related objects in view, my invention consists in the parts, improvements and combinations herein set forth and claimed.

While I have illustrated a specific embodiment of my invention, it is to be understood that my invention is not limited thereto but is as broad as my claims, and that departures may be made therefrom within the scope of the claims without departing from or sacrificing the advantages of my invention.

In the drawings forming a part of this specification, and wherein the same reference characters are applied to the same parts throughout, Figure 1 is a central vertical cross-sectional view taken on the line 1—1, Fig. 2, of a clutch mechanism in accordance with my invention. Fig. 2 is a view at right angles to Fig. 1, the cross-sectional part thereof being taken on line 2—2, Fig. 1. Fig. 3 is a fragmentary cross-sectional view taken on the line 3—3, Fig. 1, and showing the spreading screw and its connections, and Fig. 4 is a horizontal view, the sectional parts thereof being taken on line 4—4, Fig. 1.

The driving shaft is designated by the reference numeral 10 and power is applied thereto in any convenient way, as, for example, by a gear meshing with the gear 11 fixed on the shaft 10. The shaft 10 runs in suitable bearings, one bearing therefor, 12, in a frame member 13 being shown. The driven or female clutch member 14 has a bearing on the shaft 10 as at 15 and is provided with any form of power transmitting means as the gear teeth 16. The member 14 has a recess 17 formed on one face thereof for receiving the male clutch elements which engage with the wall 18 thereof.

A plate 40 is permanently secured to the shaft 10 in any convenient manner as for example by means of the key 40' and serves to carry and support the expanding clutch member and forms a cover for the recess in the inner face of the member 14.

The shaft 10 is provided with a central longitudinal opening 41 at the end at which the clutch is located, which opening is preferably square, and a rack 42, also preferably square in cross-section extends within the said hollow end of the shaft 10, and rotates therewith, and is provided with teeth 43. The shaft 10 is cut away as shown at 42ª to expose the teeth 43 of the rack 42. The teeth 43 of the rack 42 mesh with the teeth of a pinion 44 which is secured to the stub shaft 45 at about the center thereof, and the said stub shaft 45 is mounted to rotate in openings in lugs or ears 46, 46, formed on or secured to the plate 40, and which may conveniently be formed on a separate member 46ª, secured to the plate 40 as by means of screws 46ᵇ. The said stub shaft 45 is provided at the ends thereof with right and left hand screw threaded portions 47 and 48, which are received respectively in similarly threaded members 49 and 50, which pass through slots 51 and 52 in the plate 40 and are secured to the halves 53 and 54 of an expanding clutch member 55. The outline of parts 49 and 50 is shown in dotted lines in Fig. 2. The clutch members 53 and 54 have links 56, 56 pivoted thereto at the point of attachment of the members 49 and 50, and these links are pivoted to one another and to a longitudinally movable member 57, which is interposed between the halves 53 and 54 of the expanding clutch member 55, and is provided with a central parallel sided recess 58 for receiving the extension 40ª, formed on the inside of the plate 40 in such manner that the member 57, while it must rotate with the plate 40 and extension 40ª, is free to move longitudinally with respect thereto and transversely with respect to the shaft 10. The member 57 has links 59, 59 pivoted thereto at the end opposite the point of pivotal attachment of the links 56, 56 and these links 59, 59 are pivoted at their outer ends in the expanding clutch members 53 and 54. Said clutch members 53 and 54 are provided with pins or similar guiding means 60, 60 which extend through slotted openings 61, 61 in the plate 40 so as to permit movement of the clutch members for expansion and contraction, while preventing motion in other directions.

Friction members, such as blocks of wood 62, 62 are provided upon the clutch members 53 and 54 and contact with the interior face 18 of the female clutch member 14.

Longitudinal movement may be imparted to the rack 40 and thereby operate the clutch mechanism in any desired manner. In Fig. 1 there is shown a collar 63 pinned thereto and having a groove 64 in which a non-rotating actuating member as 65 may be received for actuating the rack 40 to move the same longitudinally.

Upon the rack 42 being moved longitudinally in the proper direction, the pinion 44 is rotated thereby and the rotation of the stub shaft 45 upon which this pinion is mounted, serves to separate the right and left hand screw threaded members 49 and 50, and the halves 53 and 54 of the expanding clutch to which they are connected. The separation of the clutch members to expand the same also takes place at the ends thereof opposite the point of attachment of the members 49 and 50 through the action of the links 56, 56, the longitudinally movable member 57 and links 59, 59. Upon movement of the rack 42 in the opposite direction, the clutch members 53 and 54 are drawn toward one another and the clutch is disengaged and the female clutch member 14 is free to turn upon the shaft 10. If desired, of course, the member 14 may be the one connected to the source of power and the shaft 10 and gear 11 driven therefrom through the action of the clutch, as will be readily understood.

Having now described my invention, I claim:

1. In an apparatus of the class described, the combination of a hollow shaft provided with an opening in its side, a driven member normally free to rotate on said shaft, a member fixed to said shaft, a gear on said fixed member projecting into said opening in the side of said shaft, a rack in said hollow shaft and meshing with said gear, clutch shoes on the last named member, means on one side of said shaft and operated from the said gear for moving said clutch members together and apart, and means on the opposite side of said shaft and including a pair of toggle links for also moving said clutch members together and apart, substantially as and for the purposes set forth.

2. In an apparatus of the class described, the combination of a hollow shaft, a member fixed on said shaft, a driven member normally free to rotate on said shaft and provided with an internal clutch face, expanding and contracting internal clutch shoes on said first named member and coacting with said clutch face, linkage connections between said clutch shoes for controlling the movement thereof, a right and left hand screw on said first named member and operatively screw connected with said internal clutch members, and means operated through the hollow shaft for rotating said screw and thereby expanding and contracting said internal clutch members, substantially as and for the purposes set forth.

3. In an apparatus of the class described, a shaft, a member rotating therewith, a pair of clutch shoes on said member, means for moving said shoes apart or toward one another, and means including two sets of toggle links and a connecting bar movable transversely with respect to the shaft for maintaining said shoes in substantial parallelism, said connecting bar being apertured for the passage of the shaft, substantially as set forth.

4. In an apparatus of the class described, a rotating member, a pair of clutch shoes on said member, screw means placed toward one end of the clutch shoes for moving the shoes together or apart, and means including toggle links and actuated from the screw means for moving the shoes together or apart at another region in the length thereof, substantially as set forth.

5. In an apparatus of the class described, a rotating member, a pair of clutch shoes thereon, screw means for moving said shoes together or apart, and means including two sets of toggle links and a connecting bar for maintaining the shoes in substantial parallelism during their movements, substantially as set forth.

6. In an apparatus of the class described, a hollow shaft, a member fixed thereto and rotatable therewith, clutch shoes carried by said member, means at one side of said shaft for moving said clutch shoes together or apart, and means at the other side of the shaft and actuated from the first named means for moving said clutch shoes together or apart, substantially as set forth.

7. In an apparatus of the class described, a shaft, a member rotatable therewith, clutch shoes on said member, screw means on one side of said shaft for separating or bringing together said clutch shoes, and means at the other side of said shaft to separate or bring together said clutch shoes, said last named means being operated from said screw means, substantially as set forth.

Signed in the presence of two subscribing witnesses this 13th day of May, 1913.

JOHN WEBER.

Witnesses:
L. M. FUNKE,
M. A. JOHNSON.